US005492050A

United States Patent [19]

Holtgraver

[11] Patent Number: 5,492,050

[45] Date of Patent: Feb. 20, 1996

[54] PNEUMATIC ACTUATOR WITH RACK AND PINION ASSEMBLY

[76] Inventor: Edward G. Holtgraver, 16203 Chipstead Dr., Spring, Tex. 77379

[21] Appl. No.: 194,921

[22] Filed: Feb. 14, 1994

[51] Int. Cl.[6] .............................. F01B 1/02; F01B 31/00; F16H 21/44

[52] U.S. Cl. .............................. 92/74; 92/130 A; 92/133; 92/138; 74/109

[58] Field of Search .................................... 92/68, 73, 74, 92/138, 130 R, 130 A, 128; 74/109

[56] References Cited

U.S. PATENT DOCUMENTS

| | | | |
|---|---|---|---|
| 3,156,160 | 11/1964 | Meyer et al. | 92/68 X |
| 3,452,961 | 7/1969 | Forsman | 92/138 X |
| 3,570,373 | 3/1971 | Tupker | 92/138 |
| 3,753,386 | 8/1973 | Scott, Jr. | 92/138 X |
| 3,971,296 | 7/1976 | Tugwell | 92/130 R X |
| 4,094,231 | 6/1978 | Carr | 92/128 |
| 4,487,111 | 12/1984 | Prince | 92/138 X |
| 4,627,331 | 12/1986 | Fejes | 92/138 X |
| 4,846,050 | 7/1989 | Sibeud et al. | 92/68 |
| 5,024,116 | 6/1991 | Kraft | 92/68 X |
| 5,353,690 | 10/1994 | Shin | 92/138 X |

FOREIGN PATENT DOCUMENTS

| | | | |
|---|---|---|---|
| 2622744 | 11/1977 | Germany | 92/136 |

*Primary Examiner*—Edward K. Look
*Assistant Examiner*—John E. Ryznic

[57] ABSTRACT

A pneumatic actuator including a first housing having a first cylinder formed therein, a first piston slidably positioned within the cylinder of the first housing, a first rack connected to the first piston and extending therefrom, a second housing having a second cylinder formed therein, a second piston slidably positioned within the second cylinder of the second housing, a second rack connected to the second piston and extending therefrom, and a pinion engaging the first and second rack and rotatable relative to a movement of the first and second racks. The first piston has a center axis aligned with a point of contact between the first rack and the pinion. The second piston has a center axis aligned with a point of contact between the second rack and the pinion. Each rack is supported against the pinion by a pin supported by support members arranged transverse to the axis of the pinion.

31 Claims, 6 Drawing Sheets

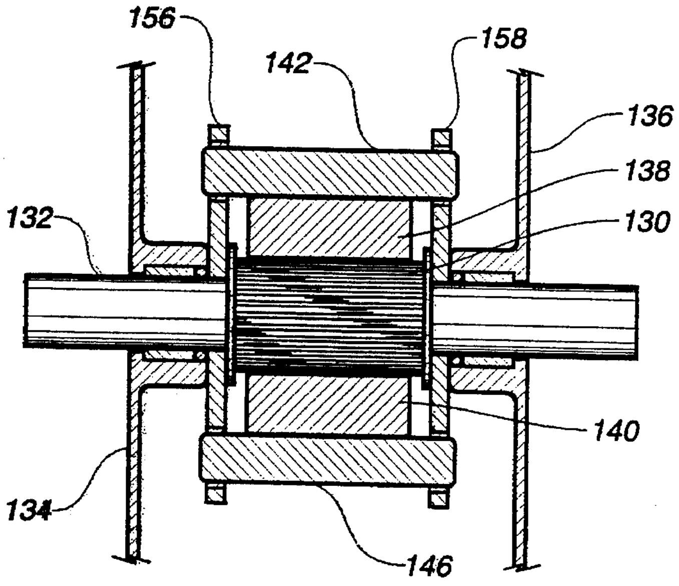
FIG. 7
FIG. 8
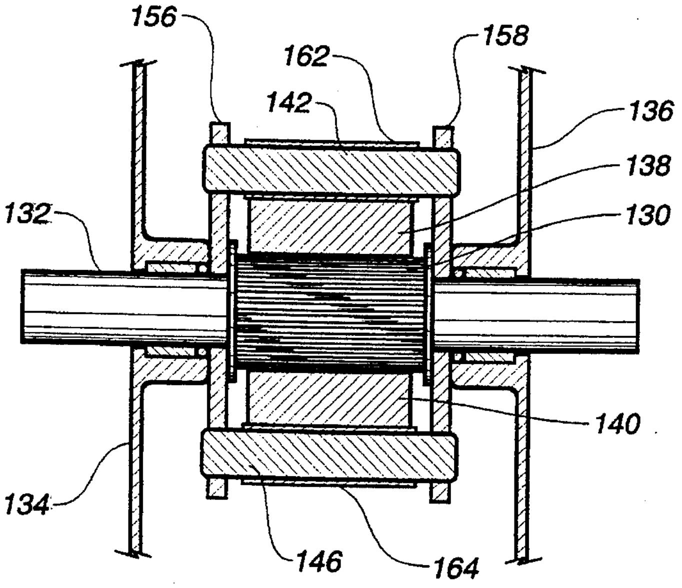

PNEUMATIC ACTUATOR WITH RACK AND PINION ASSEMBLY

TECHNICAL FIELD

The present invention relates to valves. More particularly, the present invention relates to quarter turn pneumatic actuators for valves.

BACKGROUND ART

Many types of valves and other devices require quarter turn actuation to cause the valve to be positioned such that a flow through a related pipe is regulated or stopped. Numerous styles of quarter turn actuators exist. One of these includes an arcuate piston for pure rotary motion. The majority of quarter turn actuators offered on the market employ dual pistons moving in a linear fashion for force generation and a rack-and-pinion arrangement for conversion of the force and linear motion into torque and rotary motion.

FIG. 1 is a diagrammatic illustration of a prior art pneumatic actuator. As can be seen, the dual pistons 12 and 14 are normally arranged such as to have the same center axis and to travel through a bore opening 16 which continues from one side of the actuator 10 to the other side of the actuator 10 as though it was a continuous cylinder. As the pistons 12 and 14 are aligned on their axis, the rack teeth which engage the pinion gearing 18 are, of necessity, not on the same center axis. Thus, the force F1 generated by pressure acting on the piston 12 is applied to the pinion gearing 18 at a point that is not on the center of the piston area. The piston force F2 thus acts at some distance from the piston center so as to create a moment arm and torsional forces F3 and F4 which cause the piston assembly 12 to deflect into contact with the side wall 16 of the cylinder surface in which the piston 12 travels. This, in turn, causes both ends of the piston assembly to wear against the cylinder wall 16. Suppliers have developed low friction supports for their piston assemblies in an effort to decrease wear and friction. None of these friction supports, however, have eliminated the cause of the problem.

Present actuators, such as that shown in FIG. 1, place the piston seal 20 into the piston 12 itself. As a result, the seal 20 will slide along the finely machined cylinder wall 16. Similarly, the other piston 14 will have a seal 22 positioned within the piston 14. This seal 22 will also slide along the cylinder wall 16. As a result, great machining efforts are required so as to properly fit the seals 20 and 22 into the pistons 12 and 14 and also to form the cylinder wall so as to allow for the proper movement of the pistons 12 and 14 in sealed contact with the wall 16.

Certain actuator suppliers have attempted to arrange their pistons and linkages so that the pistons move toward one another when a valve is being opened. This utilizes the smaller empty volume on the outside of the piston to develop pressures against the piston. This has many disadvantages. Many valve users wish to have the valve fall in the closed position if they should happen to lose their air pressure supply. Normally, a closed valve offers a safer situation when control is lost. Springs are placed into the actuators to force movement of the pistons when air pressure is removed. Unfortunately, all present rack-and-pinion actuators must place the springs on the outer portion of the piston assembly. This requires that the pistons move toward one another to close the valve and away from one another to open the valve.

As a result, this maximizes the adverse effect of the empty volume 24 between the pistons.

In addition to the forces caused by the normal actuator having its piston axis offset from the rack-and-pinion gear axis, there exists a second force which causes the rack portion of the piston to tend to move toward the cylinder wall in the interior area 24. This force is that which occurs from the reaction between the rack gearing and the pinion gearing 18. Various means have been employed so as to hold the rack gearing in contact with the pinion gearing. However, the most common method employed is to allow this portion of the piston assembly to rub against the cylinder wall 16 while providing a wear resistance contact surface between the sliding parts.

Many valves require accurate positioning to assure the desired performance. Unfortunately, the design of rack-and-pinion actuators makes it very difficult to incorporate travel position stops in the direction of travel where the pistons move toward one another. It is common to place travel stops on the travel direction that has the pistons moving outwardly. This is easily accomplished with stops in the end caps of the body housing. Most rack-and-pinion actuators place the springs on the outside of the piston, as stated previously, in order to provide spring closure in a failure mode. Under such a circumstance, the pistons must travel toward one another as the valve is closed. Most valves require accurate position settings in the closed position and, thus, the difficulty of incorporating travel stops when the pistons move toward one another is a severe limitation to the application of rack-and-pinion actuators.

It is an object of the present invention to provide a pneumatic actuator in which wear and friction to the cylinder walls are reduced.

It is another object of the present invention to provide a pneumatic actuator that can be more easily manufactured, has lower costs, has faster assembly times, a longer life, and simplified maintenance.

It is another object of the present invention to provide a pneumatic actuator that assures that the pistons are urged to the closed position.

It is another object of the present invention to provide a pneumatic actuator that assures more even and better sealing of the interior of the actuator.

It is a further object of the present invention to provide a pneumatic actuator that provides for easier and safer maintenance.

It is a further object of the present invention to provide a pneumatic actuator that allows for effective travel stop positioning in both directions of piston travel.

These and other objects and advantages of the present invention will become apparent from a reading of the attached specification and appended claims.

SUMMARY OF THE INVENTION

The present invention is a pneumatic actuator that comprises a first housing having a first cylinder formed therein, a first piston slidably positioned within the cylinder of the first housing, a first rack connected to the first piston and extending therefrom, a second housing having a second cylinder formed therein, a second piston slidably positioned within the second cylinder of the second housing, a second rack connected to the second piston and extending therefrom, and a pinion engaging the first rack and the second rack and rotatable relative to a movement of the first and second racks. The first piston has a center axis aligned with a point of contact between the first rack and the pinion. The second piston has a center axis aligned with a point of contact between the second rack and the pinion.

In the present invention, a first seal is positioned in a wall of the first cylinder so as to be in sealing relationship with a surface of the first piston. The first housing is formed of two identical body halves affixed together so as to define the cylinder therein. Each of the body halves is cast. The first cylinder has an unmachined surface within the first housing.

The first piston has an end surface opposite the pinion. A resilient member is interposed between the first piston and the second piston within the first and second housings. This resilient member urges the end surfaces outwardly from the piston. The first piston includes a lower member positioned within the housing. The first rack extends through the lower member. The resilient member is a first spring interposed between the lower member and the end surface. The second piston also includes an end surface opposite the pinion. A second lower member is positioned within the second housing. The second rack extends through the lower member. The resilient member is a second spring interposed between the end surface and the second lower member. The end surface is affixed to the first rack by a threaded member. This threaded member extends into the first rack for a desired distance. This desired distance is greater than a length of spring compression of the resilient member acting on the end surface. Specifically, the first rack includes a rod which extends toward the end surface of the first piston. The threaded member is received within an end of this rod. The rod extends through the lower member within the housing. The rod has a shoulder formed thereon which is in abutment with a surface of the lower member during a point of movement of the rod with respect to the lower member.

In the present invention, a second seal is positioned in the first housing between the first rack and the housing. A main actuator body contains the first and second racks and the pinion therein. The first housing and the second housing are detachably connected to the main actuator body. The first piston is detachably connected to the first rack. The second piston is detachably connected to the second rack.

In the present invention, a pin member is positioned against the first rack adjacent the point of contact of the first rack with the pinion. In one embodiment, the pin member is rotatable relative to a movement of the first rack. The pin member has ends connected to each of the body halves such that the pin member extends therebetween. Alternatively, the pin members are affixed to a support member contained within the main actuator body. The support member extends outwardly from and transversely to the output shaft of the pinion. Still further, and alternatively, the pin member can have a sleeve extending therearound. This sleeve is juxtaposed against the first rack. The sleeve is rotatable relative to the pin member. Another pin member is adjacent a point of contact of the second rack with the pinion.

A travel stop member is connected to the first piston. This travel stop member has a first surface for contacting the first housing upon a desired amount of travel of the first piston in one direction. The travel stop member also includes a second surface for contacting the first housing upon a desired amount of travel of the first piston in an opposite direction. The first and second surfaces of the travel stop member are nuts which are threadedly affixed to a rod extending outwardly of the first piston.

BRIEF DESCRIPTION OF THE DRAWINGS

FIG. 7 is a cross-sectional view of a second alternative embodiment of the pin supports in accordance with the present invention.

FIG. 8 is a cross-sectional view of a third alternative embodiment of the pin supports in accordance with the present invention.

DETAILED DESCRIPTION OF THE INVENTION

Figure 2:
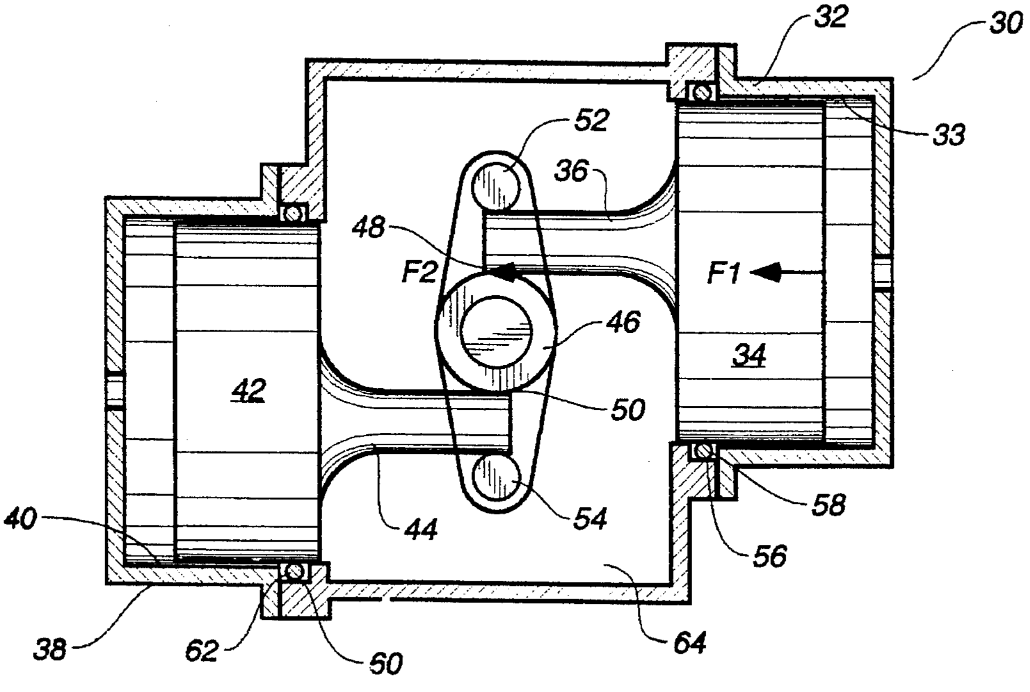
FIG. 2 is a diagrammatic cross-section view of a simplified version of the pneumatic actuator of the present invention.

Referring to FIG. 2, there is shown at 30 the pneumatic actuator in accordance with the present invention. The pneumatic actuator 30 includes a first housing 32 having a first cylinder 33 formed therein. A first piston 34 is slidably positioned within the cylinder 33 of the first housing 32. A first rack 36 is connected to the first piston 34 and extends rearwardly therefrom. A second housing 38 has a second cylinder 40 formed therein. A second piston 42 is slidably received within the second cylinder 40 of the second housing 38. A second rack 44 is connected to the second piston 42 and extends therefrom. A pinion 46 engages the first rack 36 and the second rack 44. The pinion 46 is rotatable relative to a movement of the first rack 36 and the second rack 44. In accordance with the present invention, it can be seen that the first piston 34 has a center axis which is aligned with the point of contact 48 of the first rack 36 with the pinion 46. Similarly, the second piston 42 has a center axis which is aligned with the point of contact 50 of the second rack 44 and the pinion 46. Support pins 52 and 54 are provided so as to guide the racks 36 and 44, respectively, throughout the travel relative to the pinion 46.

The pneumatic actuator 30 of the present invention is a variation on the prior art pneumatic actuator 10 in that the pistons 34 and 42 are moved so that their center axis is aligned with the edge of the pinion gear 46. As a result, the forces F1 and F2 act in the same line and prevent creation of a moment arm and torsional forces F3 and F4 that would force the piston assembly into contact with the cylinder walls 33 and 40. As a result, the wear and friction between the pistons 34 and 42 and the cylinders 33 and 40, respectively, are eliminated.

In FIG. 2, it can be seen that the first cylinder 33 has a notch 56 formed therein. The notch 56 will extend around the interior diameter of the cylinder 33 of the first housing 32. A seal 58 is received within the notch 56 so as to be in sealing contact with the outer surface of the piston 34. The seal 58 can be an O-ring type of seal. Similarly, the second housing 38 has a notch 60 formed therein. The notch 60 will extend around the interior diameter of the cylinder 40. The notch 60 will receive an O-ring type seal 62 therein. The seal 62 will be in sealing contact with the outer surface of the second piston 42.

Figure 1:
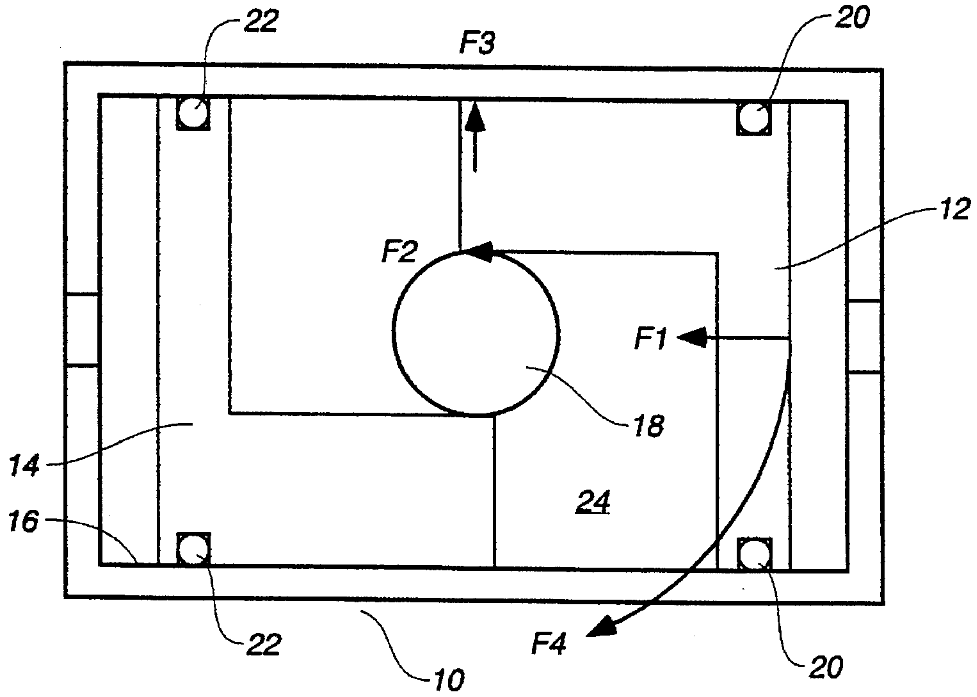
FIG. 1 PRIOR ART
FIG. 1 is a diagrammatic illustration of the prior art rack-and-pinion pneumatic actuator.

Present actuators, such as that shown in FIG. 1, place the piston seals 20 and 22 within the pistons 12 and 14, respectively. As a result, the seals 20 and 22 will slide along the cylinder wall 16. The present invention places the piston seals 58 and 62 into a seal gland formed in the cylinder walls 33 and 40, respectively. This allows the cylinder walls 33 and 40 to remain unmachined for significant cost savings. The piston surface is extended so as to allow sufficient travel of the pistons 34 and 42 through the seals 58 and 62. Accurate casting practices with certain materials allow the piston surface to remain unmachined for maximum cost savings. Other materials which cannot be accurately or consistently cast will require machining of the outer piston surface. However, because of the machining tools and times required, this machining operation is far less costly than machining the bore surface of the cylinder walls. By placing the piston seals 58 and 62 in the cylinder walls 33 and 40, respectively, the housings 32 and 38 can be cast as two halves. These halves may be perfectly identical for savings on tooling costs. By casting the body in two halves, the tooling and machining requirements are greatly simplified and assembly of the actuator 30 is made easier.

The actuator shown in FIG. 2 offers manufacturing and user advantages (i.e., lowered costs, faster assembly times, less wear, longer life, simplified maintenance, etc.). The actuator as shown in FIG. 2 does, however, share one problem in common with all rack-and-pinion actuators. This problem is that there is a considerable empty volume 64 between the pistons 34 and 42. When pressure is introduced into this portion 64 of the actuator 30, so as to force the pistons apart and to cause the valve to move, the pressure must build in the entire volume so as to develop the required force on the pistons 34 and 42. Certain types of valves require very high torques to urge them out of their seats when being opened. As a result, the actuator pressures are nearly at the maximum available before the actuator has developed sufficient torque to open the valve. Once the valve has moved out of its seat, the torque required reduces to a very small portion of that required to get it out of its seat. The pressure which has built between the pistons 34 and 42 now finds no further resistance to further expansion and it pushes the pistons far apart, almost instantly. If the valve is being used to control flow rates, this instantaneous movement causes a severe disruption to the flow rates and to the process being controlled.

Figure 3:
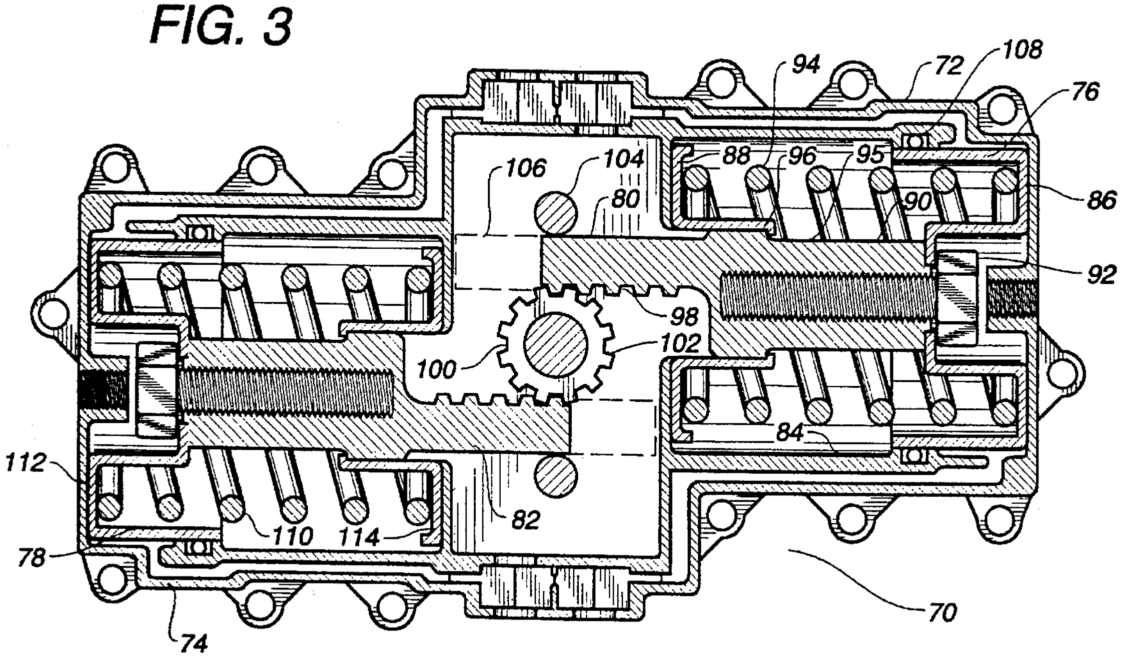
FIG. 3 is a detailed cross-sectional view of the pneumatic actuator in accordance with the preferred embodiment of the present invention.

To solve this problem, the present invention incorporates the use of springs placed between the pistons. FIG. 3 illustrates such an arrangement.

In FIG. 3, it can be seen that the actuator 70 includes a first housing 72, a second housing 74, a first piston 76, a second piston 78, a first rack 80, and a second rack 82. As can be seen in FIG. 3, the first housing 72 has an interior cylinder 84 formed therein. The piston 76 is free to move forward and backward in the cylinder 84. The piston 76 has an end surface 86 and a lower member 88. The end surface 86 is connected to a rod 90 extending from the first rack 80. A threaded member 92 secures the end surface 86 to the rod 90. A spring 94 extends between the end surface 86 and the lower member 88. The spring is arranged so as to exert a compressive force on the end surface 86 and the lower member 88. The rod 90 includes a shoulder 95 extending outwardly therefrom. The lower member 88 has an abutment portion 96 formed thereon. The abutment portion 96 will abut the shoulder 95 of the rod 90 when the piston 74 is in its uppermost position. The first rack 80 extends from the rod 90 such that its teeth 98 engage corresponding teeth 100 on the pinion 102. A pin member 104 rides along the outer surface 106 of the first rack 80 so as to cause the teeth 98 to engage the teeth 100 of the pinion 102. The pin member 104 serves to avoid any deflecting forces caused by the engagement between the pinion 102 and the rack 80. It can be seen that the rack 80, including the rod 90, extends through the opening formed in the lower member 88. As such, the rod 90 is free to move back and forth through this opening. In FIG. 3, the seal 108 is formed in a notch in the inner wall of the cylinder 84.

In the present invention, the spring 94 is positioned between the end surface 86 and the lower member 88. Similarly, the spring 110 is positioned between the end surface 112 and the lower member 114 of the second piston 78. As such, these resilient members extend between the pistons 76 and 78 of the actuator 70 of the present invention. Springs cause the piston to move apart to close the valve and toward one another to open the valve. The small volume at the end of the pistons is all that must be pressurized so as to effect the opening of the valve so that when the valve torque requirement suddenly decreases, there is little or no sudden movement of the valve and control of the flow rate and the process is fully maintained. As such, the present invention, through the use of the springs, avoids the problems caused by the instantaneous movement of the pistons once the torque required to pass the piston from its seat is applied.

Figure 4:
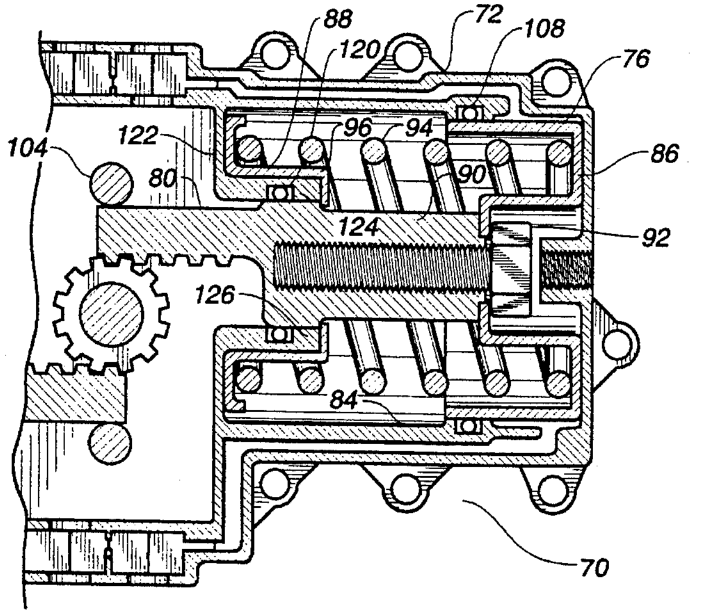
FIG. 4 is a partial cross-sectional view of the pneumatic actuator of the present invention as employing a pair of seals with a single piston.

FIG. 4 illustrates a further embodiment of the present invention in which a second seal 120 is interposed between the rack member 80 and the interior portion 122 of the housing 72. It can be seen that a notch 124 is formed on this inner surface 122 of the housing 72. An O-ring seal is positioned within the notch 124 so as to establish a sealing fit between the surface 126 of the rack 80 and interior surface 122 of the housing 72.

The use of this second seal 120, in addition to the first seal 108, reduces the pressurized volume between the pistons so as to equal that at the ends of the pistons. For those users who wish their valves to fail in the open position, this added seal 120 assures that there is no sudden movement at either end of the piston travel. Additionally, as the volumes at each end of the pistons must be filled and exhausted each time the actuator is stroked, the volume of air consumed in the normal actuator design is considerable. By the addition of the second seal 120, the air consumption is greatly reduced, thereby contributing to cost and energy savings that adds many dollars over the life of the valve and actuator. In addition, the second seal 120 prevents pressure from entering the stem area of the actuator, eliminates stem seal requirements, and assures no stem leakage or leakage between any of the joints of the stem area body portion.

Referring back to FIG. 3, when the springs 94 and/or 110 are added into the actuator 70, they are compressed to create the forces which are used to cause the actuator 70 to move in one direction when pressure is removed from the pistons 76 and 78. As the pistons move due to pressure acting upon them, the springs will compress to their maximum amount. When the pressure is fully released, the springs remain compressed sufficiently to provide the forces necessary to operate the attached valve. During maintenance, repair personnel will disassemble the actuator 70. The actuator manufacturer must provide a means of securing the spring such that the compression forces are not suddenly and unexpectedly released. If this were to happen, it is easy to see that injury to the repair personnel could result. The present invention employs a unique means to contain the spring compression forces and to prevent any form of disassembly which could result in sudden release of these forces. As can be seen, the spring 94 is contained in a cartridge mechanism for the purpose of retaining the spring compression forces. Also, the disassembly of the cartridge results in the full decompression of the spring 94 and the elimination of compression forces prior to the cartridge coming apart. As such, the present invention avoids injury. The means of cartridge disassembly enables the user and the actuator manufacturer to reassemble the cartridge and to develop the spring compression forces without the need of any type of compression device such as presses or other items. The spring compression is the result of the assembly process. The members of the cartridge are the piston 76, the lower member 88, the rod 90, and the compression screw 92. When the screw 92 is removed, the spring forces are eliminated gradually. As the screw 92 is reinstalled, the compression forces are redeveloped. As such, the threaded member 92 will have a length greater than that necessary to exceed the compression range of the spring 94. The second piston 98 is also positioned in a cartridge mechanism similar to that described in conjunction with the piston 76.

Figure 5:
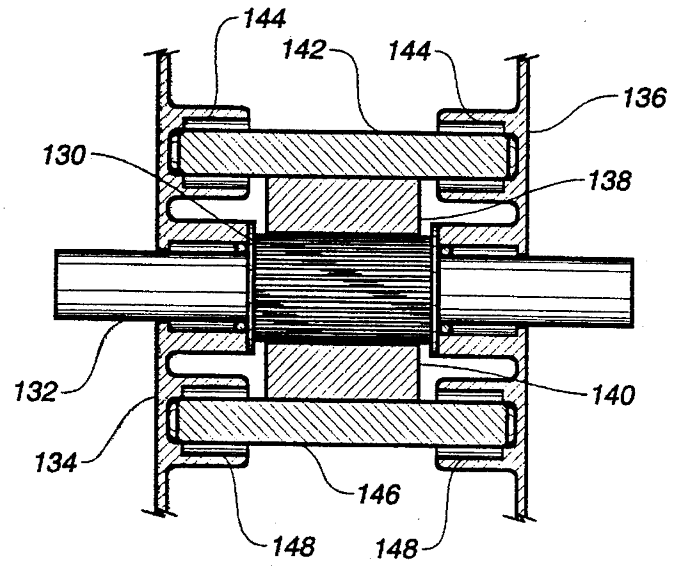
FIG. 5 is a cross-sectional view of the preferred embodiment of the pin supports of the present invention.
Figure 6:
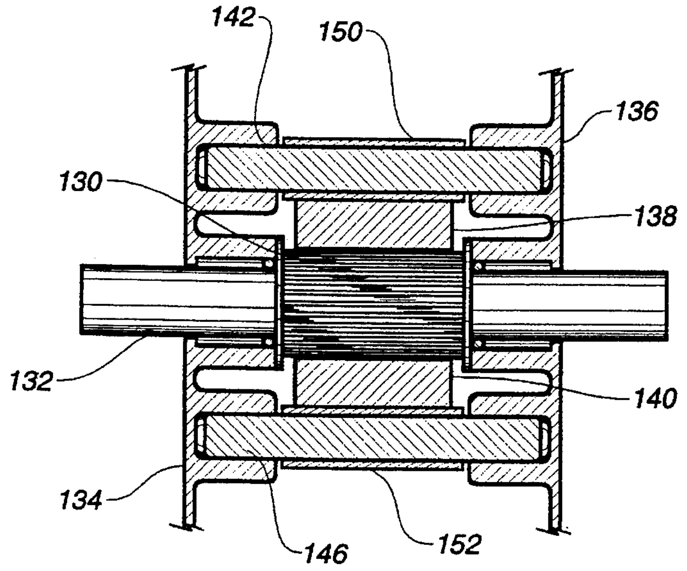
FIG. 6 is a cross-sectional view of a first alternative embodiment of the pin supports of the present invention.

Referring to FIG. 5, there is illustrated the configuration of the present invention which is designed so as to prevent the piston from being offset by the forces caused by the engagement of the rack with the pinion. In FIG. 5, it can be seen that the pinion 130 is connected to an output shaft 132. The output shaft 132 is supported on the body halves 134 and 136. The rack 138 of the first piston engages the teeth of the pinion 130. Similarly, the rack 140 of the second piston also engages the teeth of the pinion 130. Importantly, in FIG. 5, it can be seen that a pin member 142 is received within a bushing 144 attached to the body halves 134 and 136. Similarly, a pin member 146 is received within bushings 148 attached to the body halves 134 and 136. As can be seen, the present invention includes the pins 142 and 146 which extend from each side of the body housing so as to support the racks 138 and 140 of their associated pistons. The pin members 140 and 146 are supported in the body. These pins may be stationary or they may rotate within the bushings 144 and 148, respectively. Alternatively, as can be seen in FIG. 6, the pin members 142 and 146 may be surrounded by low friction sleeves 150 and 152, respectively. These sleeves 150 and 152 rotate about the pin members 142 and 146, respectively, as the racks of the pistons travel past the pins. Either the approach shown in FIG. 5 or the approach shown in FIG. 6 provides accurate positioning of the rack of the piston, provides low friction, and provides minimal wear and long actuator life.

FIG. 7 shows another alternative approach to supporting the pins 142 and 146. Instead of supporting the pins 142 and 146 in the body halves 134 and 136, the approach shown in FIG. 7 employs two stamped parts 156 and 158 as support members. These parts 156 and 158 are aligned on the output shaft 132 and extend radially therefrom. As can be seen, these stamped parts 156 and 158 may be positioned between the ends of the pinion 130 and the body halves 134 and 136, respectively. This arrangement eliminates the need of machining accurately placed holes in the body halves 134 and 136.

FIG. 8 shows that low friction sleeve bearings 162 and 164 may be placed around the pin members 142 and 146 (in the manner illustrated in FIG. 6). As can be seen in FIG. 8, the pin members 142 and 146 are received within the stamped parts 156 and 158. These stamped parts 156 and 158 can be easily produced for cost savings. These stamped parts can duplicate the dimensions of one another simply as a result of the manufacturing process. The parts can be produced by simple machining practices.

Figure 9:
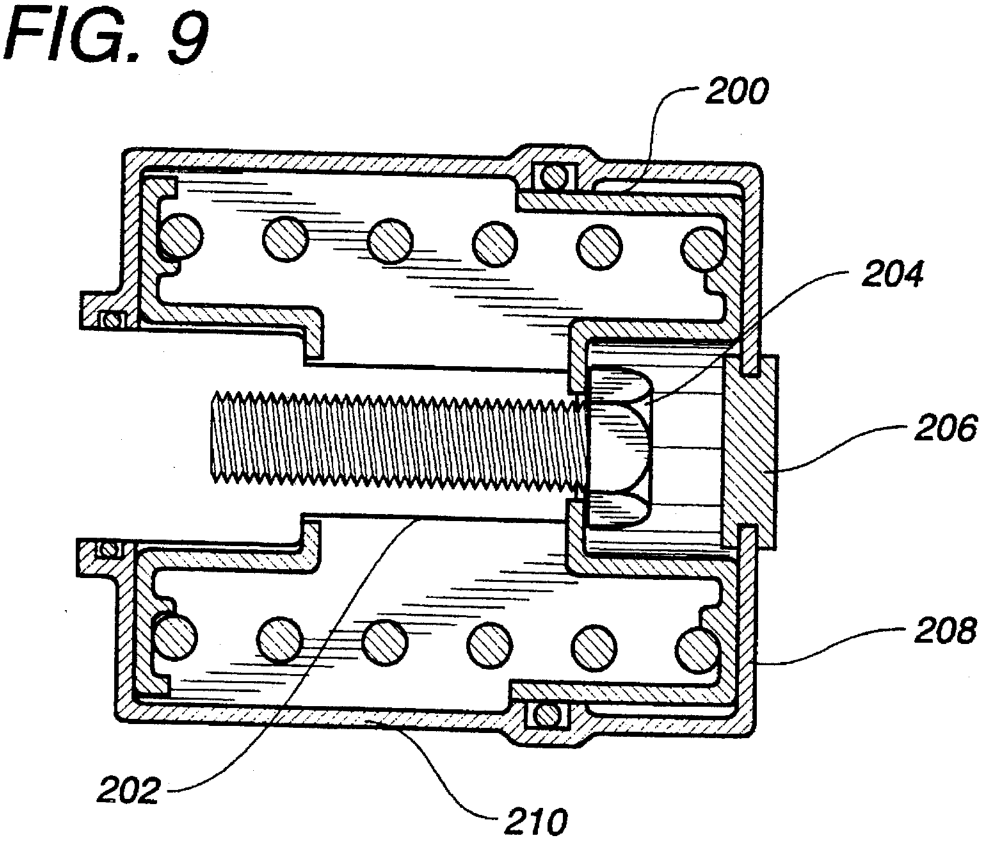
FIG. 9 is a partial cross-sectional view as showing the use of an end plug in accordance with the present invention.
Figure 10:
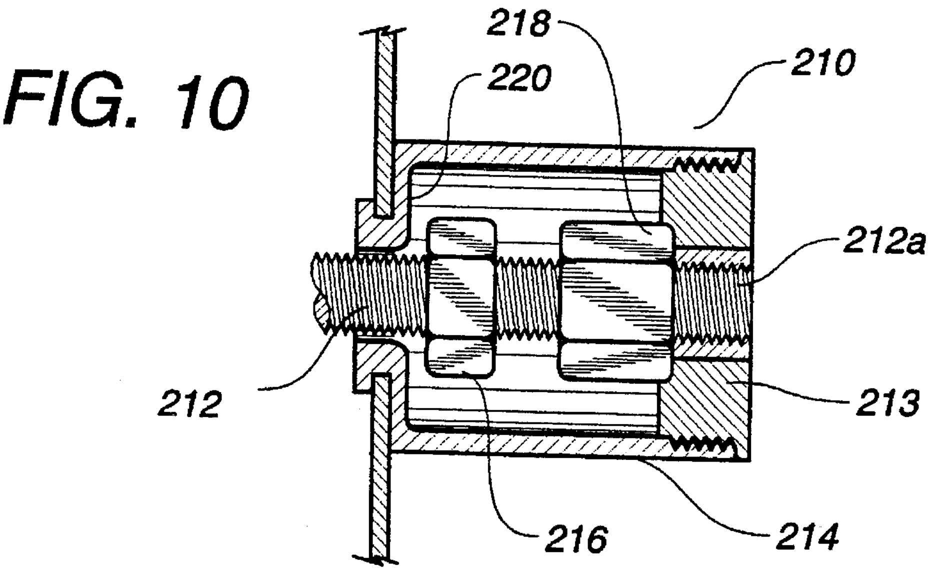
FIG. 10 is an isolated cross-sectional view showing the travel stop member of the present invention.

The present invention allows the pistons to move away from one another when the valve is closing. As such, the use of an end cap travel stop is of great benefit to the actuator of the present invention. The present invention discloses a design that allows an effective travel stop positioning technique for both directions of piston travel. This enables both open and closed valve position adjustment. The design of this travel stop is illustrated in FIGS. 9 and 10. In FIG. 9, it can be seen that the piston 200 is affixed to the rod 202 through the use of the threaded member 204. A plug 206 is provided at the end 208 of housing 210. The plug 206 is used if travel stop adjustment capability is not desired by the user. The plug 206 fits into the body end so as to effect the perfect seal with the assistance of a liquid gasket material. When travel stop positioning is desired, the plug 206 is replaced by a travel stop assembly 210, as shown in FIG. 10. So as to incorporate this travel stop assembly, the compression screw 204 is replaced by the threaded rod 212. The threaded rod 212 extends into the housing 214. A first travel stop surface 216 is affixed to the rod 212. A second travel stop surface 218 is affixed to another location of the rod 212. The end **212*a* of rod 212 is freely received within guide member 213. As such, the end 212*a* of rod 212 will move backward and forward in the guide member depending on the movement of piston 200 and the position of the stop surfaces 216 end 218. To adjust the inward travel of the piston 200, the first travel stop nut 216 is positioned so that it contacts the inner housing surface 220 when the valve is at the desired travel position. The outward piston travel is adjusted by rotating the travel stop nut 218 to a desired position. The housing 214 is removable so as to gain access for adjustment of the travel stop nuts 216 and 218**.

Figure 11:
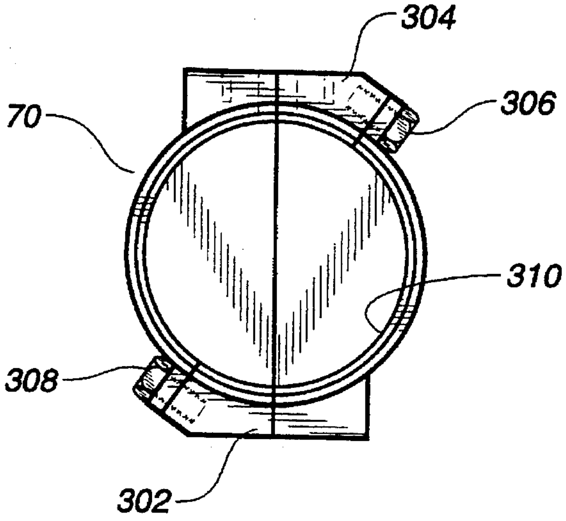
FIG. 11 is an end view of the pneumatic actuator of the present invention showing the split body halves.

FIG. 11 illustrates the split body design of the actuator 70 of the present invention. As can be seen, the actuator 70 has a first body half and a second body half 304. Members 306 and 308 are engagable between the body portions 302 and 304 so as to secure these body portions together. The cylinder 310 is defined by the connection of these body portions 302 and 304. The split body design of the actuator 70 facilitates the ability to place the end plug or the travel stop assembly (as shown in FIGS. 9 and 10). The split design is made possible due to the placement of the piston seal gland into the cylinder portion 310. The use of this piston seal gland facilitates the casting of the cylinder portion without the need to machine the cylinder bore or the piston seal gland, thus saving costs. Liquid gasket material can be used to seal between the halves. These halves may be identical to one another in order to reduce tooling costs.

Figure 12:
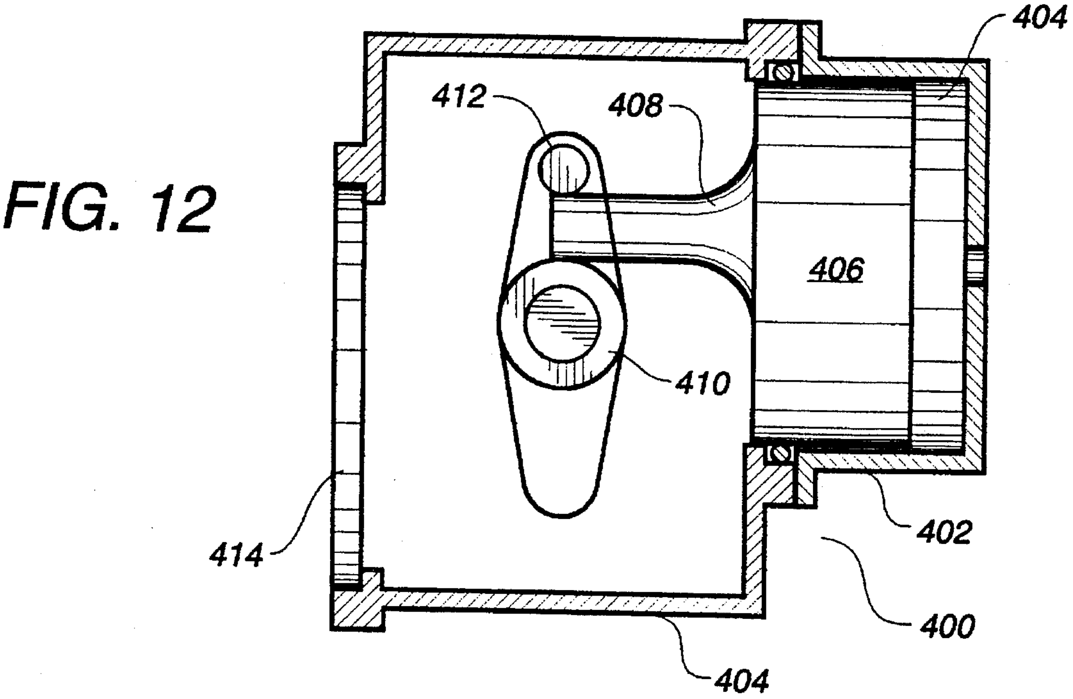
FIG. 12 is a diagrammatic cross-sectional view showing the detachability of the housings of the present invention.

FIG. 12 shows an alternative arrangement of the present invention. In FIG. 12, it can be seen that the actuator 400 includes a body housing 420 and a main actuator body 404. The body housing 402 includes an interior cylinder 404 that receives piston 406. Piston 406 has a rack 408 extending rearwardly therefrom. The rack 408 engages the pinion 410. The connection of the rack 408 to the pinion 410 is facilitated by the use of the pin member 412. The rack 408, the pinion 410, and the pin member 412 are positioned within the main actuator body 404 of actuator 400. As can be seen in the embodiment of FIG. 12 the piston and cylinder assembly can be detachably connected to the main actuator body 404 as a separate part. A single housing 402 is attached to one side of the main actuator body 404. The other side of the actuator body 404 is sealed with a plug 414. The ability to connect the piston and cylinder assemblies, as separate parts, to the main actuator body 404 benefits the manufacturer and user in that only one or both of the piston assemblies may be attached dependent upon the valve's torque requirements. If only one piston is required, the costs are reduced and the user will buy only what is required for the application. For the manufacturer, this provides double the number of sizes that would otherwise be available with no additional investment and allows the manufacturer to offer actuators suited more exactly to the user's needs.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom;

a pinion engaging said first rack and said second rack and rotatable relative to a movement of said first end second racks, said first piston having a center axis aligned with a point of contact between said first rack and said pinion, said second piston having a center axis aligned with a point of contact between said second rack and said pinion; and a first seal positioned in a wall of said first cylinder so as to be in sealing relationship with a surface of said first piston.

2. The pneumatic actuator of claim 1, said first piston having an end surface opposite said first rack, said pneumatic actuator further comprising:

a resilient member positioned between said first piston and said second piston within said first and second housings, said resilient member for urging said end surface outwardly away from said pinion.

3. The pneumatic actuator of claim 2, said end surface affixed to said first rack by a threaded member, said threaded member extending into said first rack for a desired distance.

4. The pneumatic actuator of claim 1, further comprising:

a second seal positioned in said first housing between said first rack and said housing.

5. The pneumatic actuator of claim 1, further comprising:

a main actuator body containing said first and second racks and said pinion therein, said first housing and said second housing being detachably connected to said main actuator body, said first piston being detachably connected to said first rack, said second piston being detachably connected to said second rack.

6. The pneumatic actuator of claim 1, further comprising:

a pin member positioned against said first rack adjacent the point of contact of said first rack with said pinion.

7. The pneumatic actuator of claim 6, said pin member rotatable relative to a movement of said first rack.

8. The pneumatic actuator of claim 1, further comprising:

a travel stop member connected to said first piston, said travel stop member having a first surface for contacting said first housing a desired amount of travel of said first piston in one direction.

9. A pneumatic actuator comprising:

a first housing having a first cylinder formed therein, said first housing being formed as two identical body halves affixed together so as to define said first cylinder therein, a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom; and a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion.

10. The pneumatic actuator of claim 9, each of said body halves being cast, said first cylinder being an unmachined surface within said first housing.

11. The pneumatic actuator of claim 9, further comprising:

a pin member positioned against said first rack adjacent the point of contact of said first rack with said pinion, said pin member having ends connected to each of said body halves and extending therebetween.

12. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom;

a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion; and a resilient member positioned between said first piston and said second piston within said first and second housings, said resilient member for urging said end surface outwardly away from said pinion, said first piston further comprising:

a lower member positioned within said housing, said first rack extending through said lower member, said resilient member being a first spring interposed between said lower member and said end surface.

13. The pneumatic actuator of claim 12, said second piston having an end surface opposite said second rack, said second piston further comprising:

a second lower member positioned within said housing, said second rack extending through said second lower member, said resilient member being a second spring interposed between said end surface of said second piston and said second lower member.

14. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom; and a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion, said end surface affixed to said first rack by a threaded member, said threaded member extending into said first rack for a desired distance, said desired distance being greater than a length of spring compression of said resilient member acting on said end surface.

15. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom; and a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion, said end surface affixed to said first rack by a threaded member, said threaded member extending into said first rack for a desired distance, said first rack having a rod extending toward said end surface of said first piston, said threaded member received within an end of said rod, said rod extending through a lower member positioned within said housing, said resilient member being a first spring interposed between said end surface and said lower member, said rod having a shoulder formed thereon, said shoulder being in abutment with a surface of said lower member.

16. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom;

a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion; and a pin member positioned against said first rack adjacent the point of contact of said first rack with said pinion, said pin member affixed to a support member, said pinion having an output shaft extending therefrom, said support member extending outwardly from and transversely to said output shaft.

17. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom;

a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion; and a pin member positioned against said first rack adjacent the point of contact of said first rack with said pinion, said pin member having a sleeve extending therearound, said sleeve juxtaposed against said first rack, said sleeve rotatable relative to said pin member.

18. A pneumatic actuator comprising:

a first housing having a first cylinder formed therein;

a first piston slidably positioned within said first cylinder of said first housing;

a first rack connected to said first piston and extending therefrom;

a second housing having a second cylinder formed therein;

a second piston slidably positioned within said second cylinder of said second housing;

a second rack connected to said second piston and extending therefrom;

a pinion engaging said first rack and said second rack and rotatable relative to a movement of said first and second racks, said first piston having a center axis aligned with a point of contact between said first rack and said pinion, said second piston having a center axis aligned with a point of contact between said second rack and said pinion; and a travel stop member connected to said first piston, said travel stop member having a first surface for contacting said first housing upon a desired amount of travel of said first piston in one direction, said travel stop member having a second surface for contacting said first housing upon a desired amount of travel of said first piston in an opposite direction.

19. The pneumatic actuator of claim 18, said first and second surfaces being nuts threadedly affixed to a rod extending outwardly of said first piston.

20. A pneumatic actuator comprising:

a first housing formed as two identical body halves affixed together so as to define a cylinder therein;

a first piston slidably positioned within said cylinder of said first housing;

a first rack connected to said first piston and extending therefrom; and a pinion engaging said first rack and rotatable relative to a movement of said first rack.

21. The pneumatic actuator of claim 20, each of said body halves being cast, said first cylinder being an unmachined surface within said first housing.

22. The pneumatic actuator of claim 20, further comprising:

a main actuator body containing said first rack and said pinion therein, said first housing being detachably connected to said main actuator body, said first piston being detachably connected to said first rack.

23. The pneumatic actuator of claim 20, further comprising:

a notch formed in said cylinder so as to extend around said cylinder; and a seal received within said notch so as to be in sealing contact with an outer surface of said piston.

24. A pneumatic actuator comprising:

a first housing having a first cylinder formed therein;

a first piston slidably positioned within said cylinder of said first housing;

a first rack connected to said first piston and extending therefrom;

a pinion engaging said first rack and rotatable relative to a movement of said first rack, said first piston having an end surface opposite said first rack, said first piston having a lower member positioned within said housing, said first rack extending through said lower member; and a spring means interposed between said end surface and said lower member, said spring means for urging said end surface away from said pinion.

25. The pneumatic actuator of claim 24, said end surface affixed to said first rack by a threaded member, said threaded member extending into said first rack for a desired distance.

26. The pneumatic actuator of claim 25, said first rack having a rod extending toward said end surface of said first piston, said threaded member received within an end of said rod, said rod extending through said lower member positioned within said housing, said spring means being a first spring interposed between said end surface and said lower member, said rod having a shoulder formed thereon, said rod in abutment with a surface of said lower member.

27. A pneumatic actuator comprising:

a first housing having a first cylinder formed therein;

a first piston slidably positioned within said cylinder of said first housing;

a first rack connected to said first piston and extending therefrom;

a pinion engaging said first rack and rotatable relative to a movement of said first rack;

a first seal positioned in a wall of said first cylinder so as to be in sealing relationship with a surface of said first piston; and a second seal positioned in said first housing between said first rack and said housing.

28. A pneumatic actuator comprising:

a first housing having a first cylinder formed therein;

a first piston slidably positioned within said cylinder of said first housing;

a first rack connected to said first piston and extending therefrom;

a pinion engaging said first rack and rotatable relative to a movement of said first rack; and a first pin member positioned against said first rack adjacent a point of contact of said first rack with said pinion, said pin member positioned on a side of said rack opposite said pinion, said first pin member having a sleeve extending therearound, said sleeve juxtaposed against said first rack, said sleeve rotatable around said pin member during a movement of said first rack relative to said pin member.

29. A pneumatic actuator comprising:

a first housing having a first cylinder formed therein;

a first piston slidably positioned within said cylinder of said first housing;

a first rack connected to said first piston and extending therefrom;

a pinion engaging said first rack and rotatable relative to a movement of said first rack; and a first pin member positioned against said first rack adjacent a point of contact of said first rack with said pinion, said pin member positioned on a side of said rack opposite said pinion, said pin member affixed to a support member, said pinion having an output shaft extending therefrom, said support member extending radially from said output shaft.

30. A pneumatic actuator comprising:

a first housing having a first cylinder formed therein;

a first piston slidably positioned within said cylinder of said first housing;

a first rack connected to said first piston and extending therefrom;

a pinion engaging said first rack and rotatable relative to a movement of said first rack; and a travel stop member connected to said first piston, said travel stop member having a first surface for contacting said first housing a desired amount of travel of said first piston in one direction, said travel stop member having a second surface for contacting said first housing upon a desired amount of travel of said first piston in an opposite direction.

31. The pneumatic actuator of claim 30, said first and second surfaces being nuts threadedly affixed to a rod extending outwardly of said first piston.

* * * * *